United States Patent
Sharma (10) Patent No.: US 11,781,530 B2
(45) Date of Patent: Oct. 10, 2023

(54) METHODS FOR ELECTRICAL POWER GENERATION USING THE ENERGY CONTENT OF FLUIDS PRODUCED FROM THE EARTH

(71) Applicant: AUSTIN GEOTECH SERVICES, INC., Austin, TX (US)

(72) Inventor: Mukul M. Sharma, Austin, TX (US)

(73) Assignee: AUSTIN GEOTECH SERVICES, INC., Austin, TX (US)

( * ) Notice: Subject to any disclaimer, the term of this patent is extended or adjusted under 35 U.S.C. 154(b) by 0 days.

(21) Appl. No.: 17/681,022

(22) Filed: Feb. 25, 2022

(65) Prior Publication Data

US 2022/0286020 A1 Sep. 8, 2022

Related U.S. Application Data

(60) Provisional application No. 63/158,141, filed on Mar. 8, 2021.

(51) Int. Cl.
*F03G 4/06* (2006.01)
*F01D 15/10* (2006.01)
(Continued)

(52) U.S. Cl.
CPC ............... *F03G 4/06* (2021.08); *F01D 15/10* (2013.01); *F01K 7/00* (2013.01); *F01N 5/025* (2013.01);
(Continued)

(58) Field of Classification Search
CPC ...... F03G 7/04; F03G 7/045; F03G 4/00–074; Y02E 10/10
See application file for complete search history.

(56) References Cited

U.S. PATENT DOCUMENTS 4,615,808 A * 10/1986 Gallup .................... C02F 1/042
60/641.5
5,685,155 A * 11/1997 Brown ....................... F02C 1/00
60/659
(Continued)

FOREIGN PATENT DOCUMENTS

CN 202851278 U * 4/2013
CN 103147942 A * 6/2013
(Continued)

*Primary Examiner* — Laert Dounis
(74) *Attorney, Agent, or Firm* — Kowert, Hood, Munyon, Rankin & Goetzel, P.C.; Gareth M. Sampson (57) ABSTRACT

Systems and methods are described for generating electricity from fluid produced from a subsurface formation. The disclosed systems and methods include generating electrical power using the energy content of fluids produced from the earth or hot fluids created during surface processing of the produced fluids. Fluid is obtained from a well in the subsurface formation and provided to a first power generation device where a pressure and a temperature of the fluid is adjusted to a pressure and a temperature compatible with the first power generation device using one or more valves coupled to the first power generation device. The first power generation device generates electricity from the fluid. One or more second power generation devices also generate electricity using the fluid where one of the second power generation devices is a thermoelectric generator.

17 Claims, 7 Drawing Sheets

(51) Int. Cl.
*F01K 7/00* (2006.01)
*F01N 5/02* (2006.01)
*F28D 21/00* (2006.01)
*F03G 4/00* (2006.01)
*F02C 1/00* (2006.01)

(52) U.S. Cl.
CPC .............. *F02C 1/00* (2013.01); *F03G 4/00* (2021.08); *F03G 4/026* (2021.08); *F03G 4/072* (2021.08); *F28D 21/00* (2013.01); *F05D 2220/60* (2013.01); *Y02E 10/10* (2013.01)

(56) References Cited

U.S. PATENT DOCUMENTS

| | | | |
|---|---|---|---|
| 9,470,212 B2 * | 10/2016 | Hadianto | F03G 7/04 |
| 10,249,809 B2 | 4/2019 | Lessard | |
| 2002/0185168 A1 * | 12/2002 | Hunt | H01L 35/30 |
| | | | 136/208 |
| 2010/0089060 A1 | 4/2010 | Ferguson et al. | |
| 2010/0288322 A1 * | 11/2010 | Schroeder | H01L 35/30 |
| | | | 136/207 |
| 2011/0048408 A1 * | 3/2011 | Newman | F03G 6/005 |
| | | | 126/646 |
| 2013/0219872 A1 * | 8/2013 | Gibble | F02N 19/10 |
| | | | 60/320 |
| 2022/0259990 A1 * | 8/2022 | Li | F01N 5/02 |

FOREIGN PATENT DOCUMENTS

| | | | |
|---|---|---|---|
| RU | 174569 U1 * | 10/2017 | |
| WO | WO-03081038 A1 * | 10/2003 | F02C 1/00 |

* cited by examiner

METHODS FOR ELECTRICAL POWER GENERATION USING THE ENERGY CONTENT OF FLUIDS PRODUCED FROM THE EARTH

PRIORITY CLAIM

This patent application claims priority to U.S. Provisional Patent Application No. 63/158,141 to Sharma, filed Mar. 8, 2021, which is incorporated by reference as if fully set forth herein.

BACKGROUND OF THE INVENTION

1. Field of the Invention

Embodiments described herein relate to systems and methods for electrical power generation using the energy content of fluids produced from the earth or hot fluids created during surface processing of these produced fluids. Specific embodiments described relate to systems and methods for utilizing heat and pressure of oil, gas, or water to generate electrical power.

2. Description of the Relevant Art

Oil, gas, and geothermal reservoirs are subsurface rock formations that contain water, oil, or gas at temperatures and pressures that can be substantially higher than at the surface. These elevated temperature and pressures may provide a source of energy that can be extracted to generate electricity (e.g., electrical power) and that can be utilized and transported efficiently. In addition, the surface processing of these fluids can lead to fluid streams that contain a great deal of heat. For example, gases are sometimes flared, and this process leads to the production of very hot flue gases. Produced gases are often compressed leading to a significant increase in temperature of the produced gas. Power generation equipment, gas compressors, and other fluid processing equipment generate a very significant amount of heat, which may, in some embodiments, be used by the methods described herein.

U.S. Pat. No. 10,249,809 to Lessard ("the '809 patent"), which is incorporated by reference as if fully set forth herein, describes a system for producing electricity from fluids that includes a boiler that heats a fluid. The boiler may direct a first portion of the heated fluid to a turbine for the generation of electric power and a second portion of the heated fluid to a thermoelectric (TE) generator. A condenser is connected to the turbine to condense hot fluid emitted from the turbine and feed the condensed fluid to the TE generator. The TE generator generates electric power from a difference in temperature of the heated fluid from the boiler and the condensed fluid from the turbine. The steam Rankine cycle is used in the '809 patent.

The process in the '809 patent relies on a boiler to heat the produced water to generate steam, a portion of which is then used by a turbine or a thermoelectric generator (TEG) to produce electricity. The heated fluid is used directly in the turbine or TEG. There are two major problems with this method. First, the method requires the availability of a fuel, usually burning a fossil fuel (gas, coal, or oil), in the boiler. This results in both an incremental cost and in the generation of greenhouse gases ($CO_2$). Secondly, this method uses the heated, produced fluids directly in the turbine and TEG. When produced fluids from the earth are used, the presence of salt in the brine and the presence of corrosive gases and solids in the produced fluids can result in major problems with corrosion, scale and erosion. These problems can significantly shorten the life of both the turbines and the TEG. The problems associated with produced fluids (brine, oil and gas) can, in many instances, make the extraction of heat from such fluids impractical and uneconomical using the method in the '809 patent. Thus, there is a need for practical and economical systems and methods for generating electricity from fluids produced from the earth.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE PREFERRED EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The present disclosure recognizes that the generation of electricity with little or no carbon emissions requires new methods for extracting energy from primary energy sources. Oil, gas, and geothermal reservoirs are subsurface rock formations that contain water, oil or gas at temperatures and pressures that can be substantially elevated compared to fluids at the surface. These elevated temperature and pressure fluids may provide a source of energy that can be extracted to generate electricity (e.g., electrical power). Additionally, the source of energy or the generated electricity can be utilized and transported efficiently. The present disclosure describes carbon neutral methods to extract energy from these fluids and convert the energy to electricity using an optimal combination of turbines, twin-screw expanders and a modular array of thermoelectric generators.

The temperature of fluids in the earth increases with depth. The increase in temperature for every foot of depth may be referred to as the geothermal gradient. Normal geothermal gradients are in the range of about 1.5° F. to about 1.6° F. per 100 feet of depth. However, in many formations the geothermal gradient can be much higher (over 2° F. per 100 ft. of depth). For example, along the Gulf coast of Texas, temperatures of about 300° F. to about 350° F. are measured at depths of 10,000 ft. to 14,000 ft. When a well is drilled into these high temperature formations, the fluid temperature at the wellhead can be very high (e.g., about 250° F. to about 350° F.). Sometimes these formations contain oil and gas and sometimes they may produce only water with some dissolved hydrocarbons.

The increase in pore pressure with depth may be referred to as the pore pressure gradient. The pore pressure gradient is customarily expressed in units of psi per foot. For example, normally pressured aquifers and oil reservoirs have pore pressure gradients of about 0.433 psi/ft to about 0.5 psi/ft. This pore pressure gradient corresponds to the pressure generated by a column of fluid with a density of water or brine (about 1.0 g/cm$^3$ to about 1.2 g/cm$^3$). This hydrostatic gradient is the pressure expected to be seen in most normally pressured formations. In some formations, the pore pressure can be much higher than this. For example, pore pressure gradients of about 0.6 psi/ft to about 0.95 psi/ft are encountered in many over-pressured formations along the Texas Gulf coast. In the Frio formation in Texas, normal pore pressure gradients are observed at depths less than 8,000 ft. to 10,000 ft. However, in the over-pressured zone (below 10,000 ft), the pore pressure gradients are much higher. When a well is drilled into these over-pressured formations, fluids (e.g., water, oil, or gas) flow to the surface at very high pressures. Wellhead pressures of several thousand psi are observed in such wells and the wells flow fluid naturally (e.g., without the aid of any pumps).

The production of high pressure and temperature fluids at the wellhead (at the surface), from these over-pressured high temperature reservoirs presents a large source of thermal and mechanical energy that can be harvested with the application of the methods disclosed herein. Over-pressured formations offer the clear advantage that no external energy is needed to produce the fluids to the surface. Without the need for external energy, pumping costs may be saved and energy use may be reduced.

In some instances when fluids are produced from normally pressured formations, the pressure and temperature in the produced fluids is lower (less than about 200° F. and less than about 500 psi). In such instances the methods to convert the thermal and pressure energy to electrical energy are different and are also disclosed herein. Without the proper selection and combination of the different power generation methods, the power extracted may not be commercial or practical. Each set of conditions (e.g., fluid type, flow rate, temperature, and pressure) require the application of a specific combination and design of power generation equipment that offer unique and non-obvious advantages.

In various embodiments, the methods disclosed herein include integrating a heat exchanger with thermoelectric devices such that a portion of the heat from hot fluids is converted to electricity. Such methods may reduce the load on the heat exchanger while generating carbon free electricity. In some embodiments, the use of a boiler is not required. Thus, since no fossil fuel must be burnt to heat the fluids, the methods may be carbon neutral or possibly even carbon negative.

In various embodiments, a working fluid in an organic Rankine cycle is utilized to overcome problems associated with corrosion and scaling of the turbine or other power generation devices when produced brine is used directly in turbines or other expanders. In such embodiments, the produced fluid never needs to come into contact with the turbine, and thus issues with corrosion scale and particulates are significantly reduced or eliminated. The embodiments contemplated herein are disclosed to utilize heat from any (or all) of the produced fluids (e.g., produced oil, water, or gas).

In various embodiments, the methods disclosed herein do not rely on the use of a steam turbine in parallel with TEGs (as proposed by the '809 patent). Instead, either a gas turbine, a steam turbine, or a twin-screw expander may be used in series or in parallel with TEGs. In some embodiments, the particular selection and arrangement of these devices is made based on the produced fluid type (e.g., oil, water, or gas), their flow rates, and their pressure and temperature.

Figure 1:
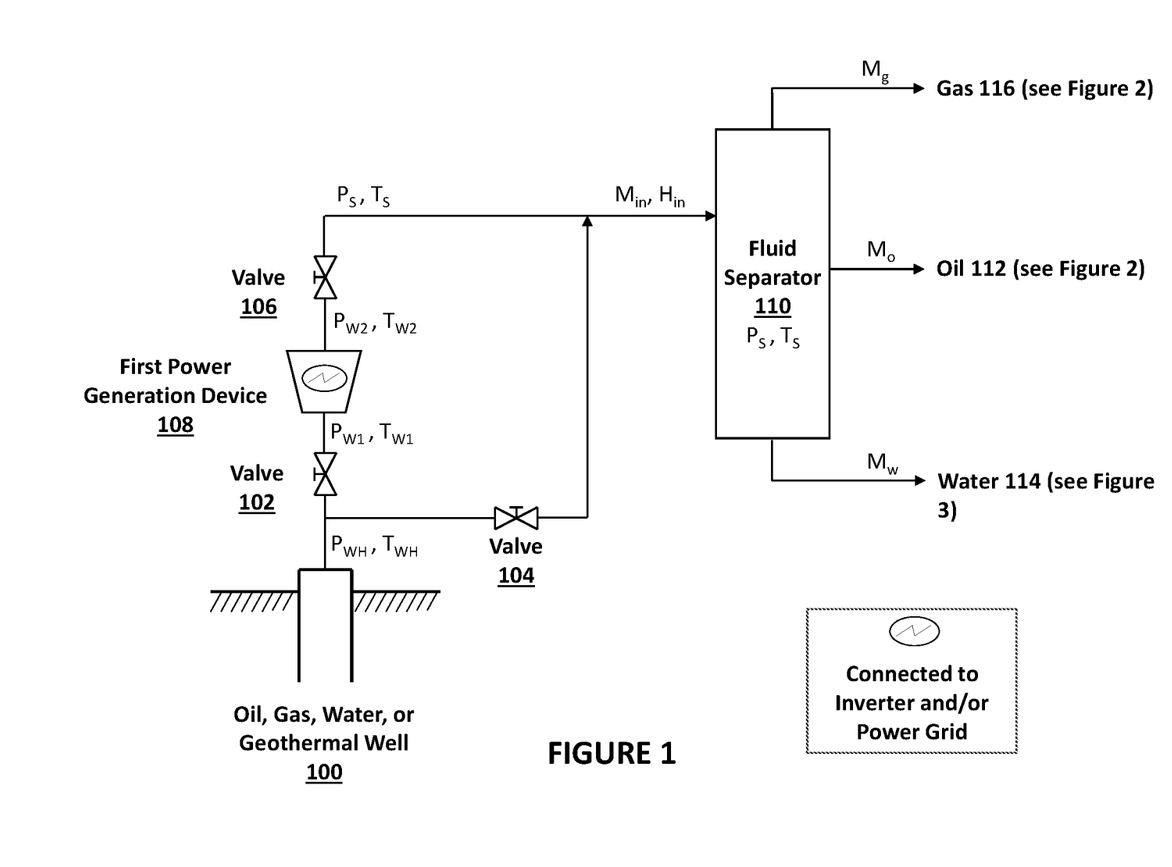
FIG. 1 depicts a representation of an embodiment using a flow turbine or twin-screw expander placed between a system of chokes.

When the temperature and pressure of the produced fluids is high, it may be possible to utilize the pressure at the wellhead to generate power using a flow turbine or twin-screw expander placed between a system of chokes that can be used to control the pressure and the flow rate through the turbine or twin-screw expander. FIG. 1 depicts a representation of an embodiment using a flow turbine or twin-screw expander placed between a system of chokes. In certain embodiments, the pressure and temperature at the wellhead 100 ($P_{WH}$, $T_{WH}$) is adjusted by valve 102 and valve 106 (e.g., chokes) to make it compatible with the inlet pressure and temperature ($P_{WH1}$, $T_{WH1}$) of the first power generation device 108. First power generation device 108 may be, for example, either a flow turbine or a twin-screw expander. Without first power generation device 108, the entire pressure drop may occur across the choke (valve) and the fluid energy is wasted. The use of a gas expansion chamber in a turbine in first power generation device 108 utilizes the pressure and temperature energy to drive a turbine shaft that can produce electricity. In embodiments of many oil and gas wells, however, the produced fluid may include oil, water, and gas phases. Such a multi-phase mixture may not be compatible with the functioning of a typical turbine used in first power generation device 108. Thus, in some contemplated embodiments, specially designed turbines that can utilize multi-phase fluids are used. For example, twin-screw expanders may be more suitable for use with such multi-phase fluids. However, if the produced fluids are single phase gas or water (as is the case in some gas and geothermal wells), first power generation device 108 may include either standard turbines or twin-screw expanders.

In various embodiments, the high pressure, high temperature fluids produced from the earth are separated into oil, water and, gas in a high-pressure separator 110. The pressure and temperature in the separator 110 ($P_{WH2}$, $T_{WH2}$) may be controlled by valve 106 (e.g., a choke), as shown in FIG. 1. As described above, in some embodiments, the fluid being produced may only include a single phase such as water or gas. In such embodiments, a separator may not be required. As depicted in FIG. 1, the flow rate of the fluids to the surface separator 110 may be regulated by a set of chokes and valves (e.g., valves 104 and 106). Opening the choke/valve allows more fluid to flow out and closing the choke/valve restricts the volume of fluid produced.

Figure 2:
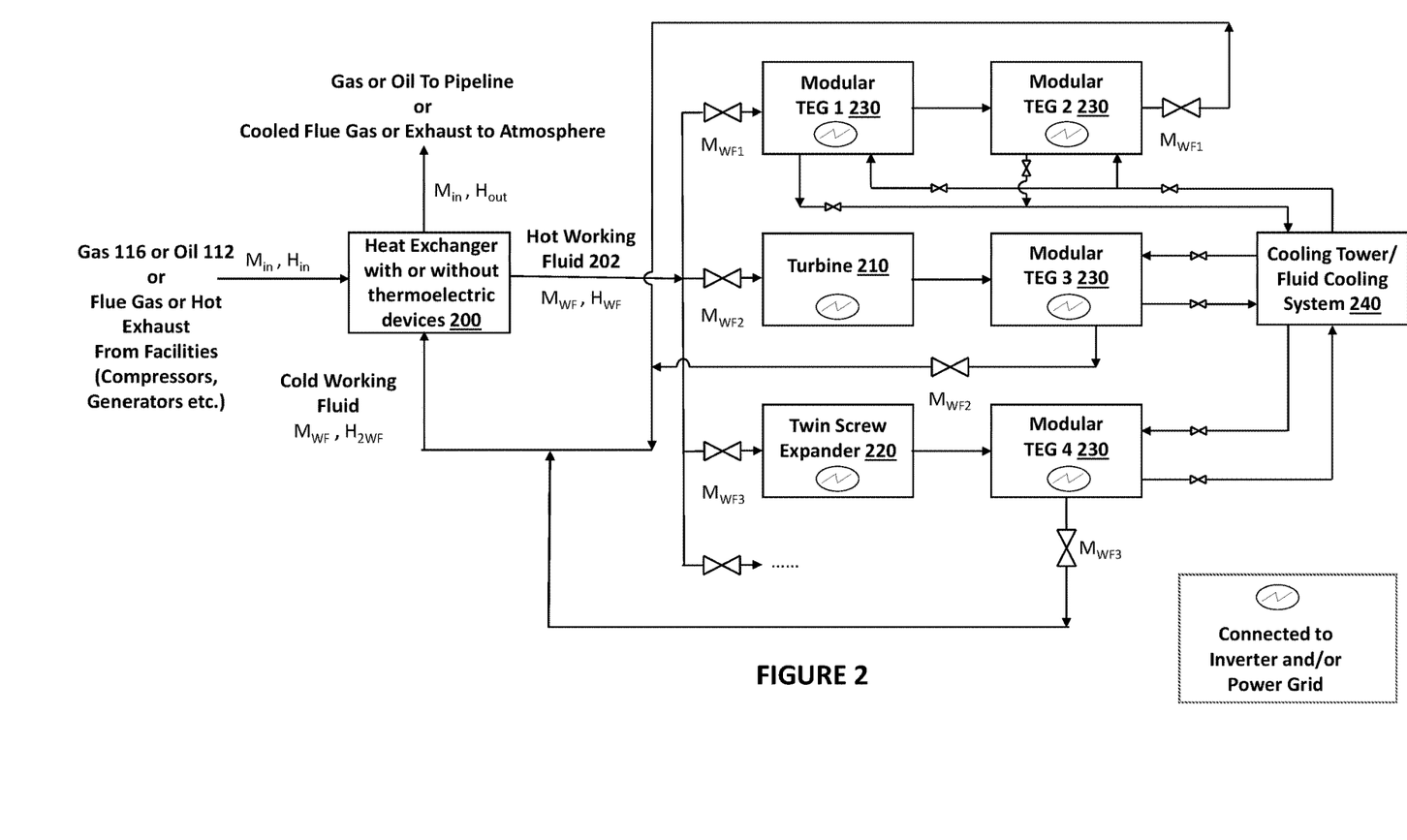
FIG. 2 depicts a representation of an embodiment of a configuration of generators that can be used in series or parallel to generate electricity from the oil and gas streams.

As shown in FIG. 1, fluid separator 110 may provide up to three streams of fluids: oil 112, brine (water) 114, and gas 116. In certain embodiments, the heat in all these streams 112, 114, 116 is extracted to produce electricity. FIG. 2 depicts a representation of an embodiment of a configuration of generators that can be used in series or parallel to generate electricity from the oil and gas streams. In certain embodiments, the mass flow rate ($\dot{M}_{in}$) and the enthalpy in the oil or gas stream ($H_{in}$) determine the energy content of the fluid. This energy may be extracted from the fluid using a heat exchanger 200. In some embodiments, the heat exchanger may be modified to include thermoelectric devices as a part of the heat exchanger. For example, the plates in a plate and frame heat exchanger may be relayed with specially designed plates that contain thermoelectric cells between the hot and cold sides of the plate. The plates allow electricity to be generated while conducting heat transfer from the hot fluid to the working fluid (e.g., the intended purpose of the heat exchanger). In addition, the conversion of part of the heat flux to electricity can reduce the load on the heat exchanger.

The hot working fluid 202, which has a smaller energy content ($H_{1wf}$), may then be directed to a combination of turbines 210, twin-screw expanders 220, and TEG modules 230 depending on the temperature and pressure of the hot working fluid. For example, if the fluid stream 202 is at high pressure and temperature, it may be most efficient to run it through a gas turbine 210 and a series of TEG modules 230. If the temperature and pressure are lower, it may be better to use a twin-screw expander 220 with a series of TEG modules 230. After passing through the TEG modules 230, the working fluid 202 (that has now been cooled down) can be recirculated to the heat exchanger 200 for reheating.

In various embodiments, thermoelectric generators (e.g., TEG modules 230) are devices that generate a voltage when a temperature difference is applied across the devices. Alternatively, thermoelectric generators may cool down a fluid stream when a voltage is applied across the devices. Thermoelectric generators have been used in the past for small-scale applications, such as small electronic devices, coolers, and refrigerators. Thermoelectric generators have not been used for large-scale applications (such as power generation from oil, gas, or water production) because of their cost and lack of reliability. Recent developments in thin film thermoelectric generators (TF-TEGs), however, has led to significant improvements in reliability and reductions in cost. As disclosed herein, a multitude of these thermoelectric generators (TF-TEGs) may be used in series and in parallel to generate a DC voltage and current that can be harvested from the hot water, oil, or gas. The DC electrical energy may then be run through an inverter to convert it to AC electrical output that can be used locally or sold to an electric utility.

In certain embodiments, TEG modules 230 include thin film thermoelectric cells that can produce 225 W of power for every 100° C. of difference in temperature across a cell (hot side temperature minus the cold side temperature). Several cells may be manufactured in a single thin film TEG wafer. In some embodiments, power levels of about 0.1 kW to 10 kW may be obtained from a single TEG wafer. Several of these wafers can be integrated into a single TEG assembly in a modular fashion to generate power levels of 10 kW to over 1 MW. In certain embodiments, it may be desirable to direct a large amount of heat through the TEG cells to ensure that a maximum electrical output is obtained.

Figure 5:
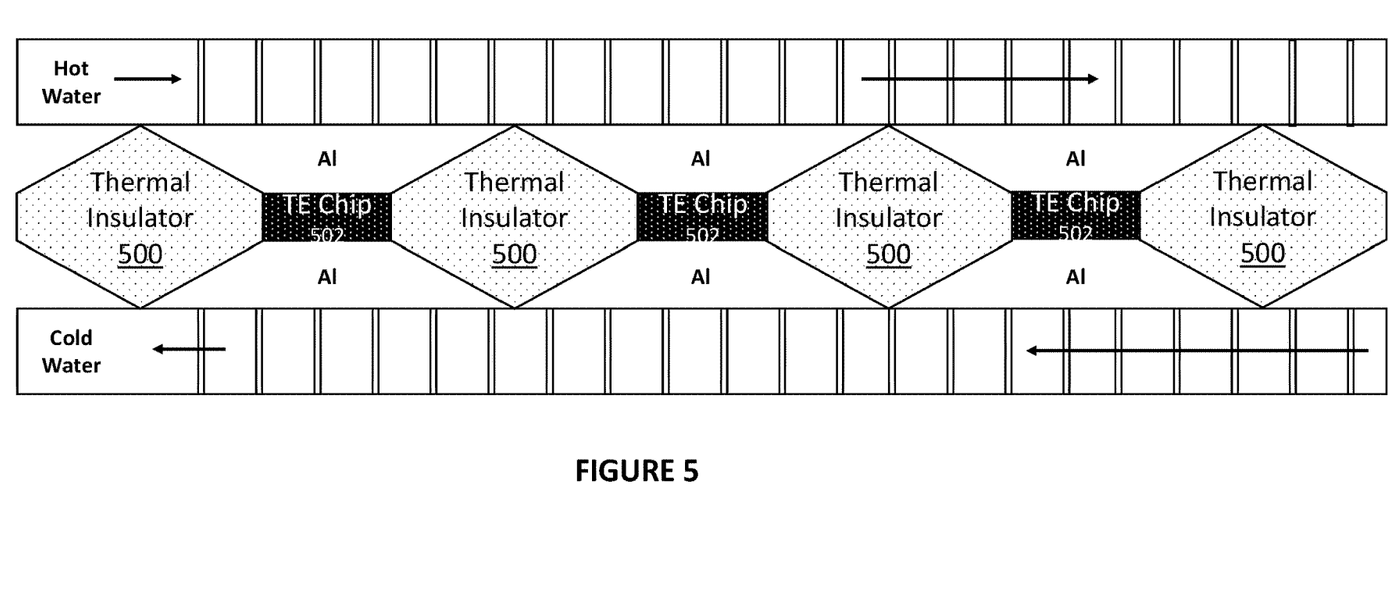
FIG. 5 depicts a representation of an example embodiment of an arrangement of thermoelectric generation (TEG) cells.

FIG. 5 depicts a representation of an example embodiment of an arrangement of TEG cells. In some instances, the solid-fluid surface area needed to transfer the heat from the fluid to the TEG needs to be increased to generate additional electricity. This arrangement of TEG cells and thermal insulating material illustrates one example of how this can be accomplished. In the illustrated embodiment, the heat flux is focused towards the TEG cells 502 by the use of thermal insulators 500 (e.g., thermal insulating materials packaged with the TEG cells). This arrangement also includes heat fins that are used to increase the heat transfer from the hot and cold fluids to and from the TEG cells. Other arrangements of TEG cells may also be contemplated for the purpose of increasing the heat flux from the hot to the cold side through the TEG cell or wafer, while minimizing the parasitic heat flux outside the TEG cells.

In various embodiments, several of these TEG wafers are placed in series or parallel depending on the voltage and current desired. TEG cells can be arranged in different configurations to ensure that the maximum amount of heat may be captured by the array and converted to electricity. A large number of smaller cells (each containing a multitude of p and n junctions) or a smaller number of larger cells may be used in such an array.

Figure 6:
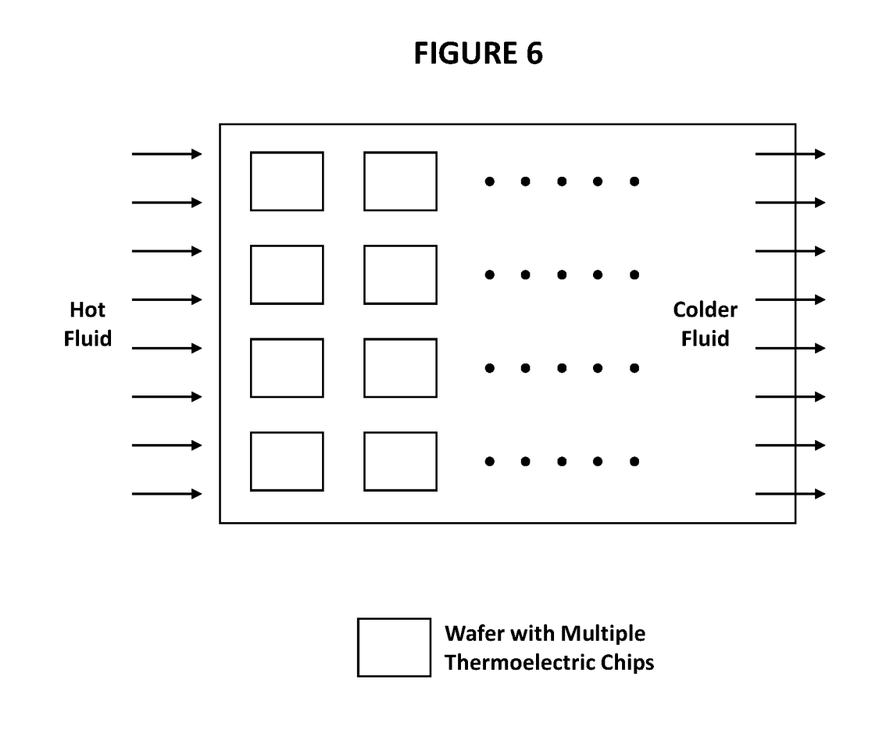
FIG. 6 depicts a representation of an example embodiment of an arrangement of TEG wafers in a rectangular array.

FIG. 6 depicts a representation of an example embodiment of an arrangement of TEG wafers in a rectangular array. The arrangement of cells shown in the illustrated embodiment is planar. The cells, however, may also be arranged on a cylindrical surface or a surface with a more complicated shape. On the hot side of the cell hot fluid enters one end of the array and colder fluid exits the other end of the array after a portion of the heat has been extracted from the fluid. On the cold side of the cell, cold fluid is circulated counter-current to the hot fluid to maintain a large temperature difference between the hot and cold sides. The fluid on the cold side may be recirculated through a cooling tower or other refrigeration device to cool it continuously (for instance, cooling tower 240, shown in FIGS. 2, 3, and 4). In some embodiments, if a large supply of cool water is available, the cold side fluid may not be recirculated, and it may pass through the TEG cell only once.

In certain embodiments, an advantage of the TEG wafer arrays (that may also be referred to as TEG bricks) is that they are modular and can be arranged in any manner depending on the temperature and flow rate of the fluid stream. For example, if the fluid stream is very hot and at a high flow rate, the temperature decrease across each TEG brick may only be a few 10s of degrees. In such an instance, several TEG bricks can be placed in series. If the fluid stream has a high flow rate but a relatively low temperature, the TEG bricks can be arranged in parallel such that temperature change from the inlet to the outlet of the TEG brick can be substantial and most of the heat can be extracted in one pass through the TEG brick. Similarly, other combinations of TEG bricks in series and parallel can be used to maximize the heat extraction rate per cell. The number and arrangement of wafers in each TEG brick (such as shown in FIG. 6) can also be varied to achieve this goal.

In some embodiments the thermoelectric cells can be embedded in a flexible, thermally conductive substrate that allows the long strip of cells to be wrapped onto a pipe or other source of heat. The heat from the pipe can then be used to generate power with the cold side being exposed to air or to some other cold fluid. For example, in a tube and shell heat exchanger, the high temperature fluid in the tubes can be wrapped or otherwise covered by the TEG cells to generate power.

In some embodiments, using thermoelectric generation with combustible materials such as oil and gas poses safety risks. For instance, the DC voltage generated by the TEG can cause an electrical discharge and can be a safety hazard. In some embodiments, to prevent this, heat exchanger 200 can be used (shown in FIG. 2) as an intermediate step to extract the heat into a non-combustible and safe working fluid 202 (such as water or another hot working fluid). Hot working fluid 202 may then be used in either a thermoelectric generator (TEG) or a turbine, or both, as described above. In such embodiments, heat is transferred from the water, brine, oil, or gas to the working fluid 202 using heat exchanger 200. The working fluid 202 is then used to drive the turbine 210 and generate electricity. Examples of working fluids include, but are not limited to, alkanes such as butane, iso-butane, iso-pentane, alcohols, and other low boiling point organic fluids.

The packaging of thermoelectric devices into a compact, high temperature and pressure chamber can be accomplished in different ways. For example, to ensure that the hot fluids (water, steam, oil, or gas) are never in direct contact with the thermoelectric (TE) cells, these TE cells may be separated from the high and low temperature fluids by a corrosion resistant material of high thermal conductivity that can effectively transmit heat to the thermoelectric devices. The corrosion resistant material may prevent any corrosion or scale problems from affecting the performance of the TEG devices. In certain embodiments, the low temperature side of the thermoelectric devices are needed to be kept cool. This may be achieved by exposing the low temperature side to a flowing water, brine, or air stream to carry away the heat and keep this end of the device cool.

As described herein, multiple TEG devices can be placed in series or in parallel. The optimum arrangement of these devices may vary depending on, for example, the power generation capacity of the array and the temperature of the inlet and outlet fluids. For instance, in one embodiment of this arrangement, a multitude of TEGs are placed on a single substrate and connected in series and parallel to generate a desired voltage and current. Several of these devices may then be placed in parallel to increase the power output of the array. Many such arrays can also be used in parallel in a modular fashion to increase the power output further. This modular design may provide several advantages:

The manufacture of the modules can be standardized, thereby reducing their cost.

The power output from the modules can also be increased or decreased at any time by redirecting the hot and cold fluids through the array depending on the power requirements at that time.

The TE power output and cost of the array is highly scalable and easily customizable.

The modular nature of the TE array may make it more reliable and fault tolerant. For example, failure of one module can temporarily be compensated for by another module in the array.

The array can be placed on a mobile skid that can be relocated easily from one well to another to reduce the distance the hot fluids from the well have to be transported.

As described herein, thermoelectric devices may be integrated with a heat exchanger that is used to cool the hot fluids. For example, if a plate and frame heat exchanger is used, the plates can be modified to include thermoelectric devices. Since the plates have hot fluid on one side and cold fluid on the other, the presence of thermoelectric devices in the plates may result in significant power generation while the hot fluids are being cooled in the heat exchanger, as intended by the heat exchanger's normal function. This setup has the added benefit of reducing the load on the heat exchanger since not all the heat is transferred from the hot fluid to the cold fluid (e.g., part of the thermal energy is converted to electricity by the thermoelectric devices).

The embodiments described above disclose methods for how energy can be extracted and converted efficiently to electricity from high temperature, high pressure produced oil and gas streams. As noted earlier, in many embodiments, water or brine is co-produced with the oil or gas. In various instances (such as in geothermal wells), the well may produce only water (or brine) with some dissolved gas. Geothermal brines and brines co-produced with oil and gas are often brackish and may contain differing concentrations of salts. If the produced fluid is primarily high temperature, high pressure water or brine, the fluid may flash into two phases—high pressure produced water (or brine) and steam. This flashing process involves a sudden decrease in pressure of the superheated produced water or brine. Some droplets of brine and particles of salt and rock minerals may still remain suspended in the steam phase. The steam generated from brines is, therefore, very different than the steam generated from traditional boilers that use clean, fresh water. The presence of salt and possibly hydrocarbons in the brine can complicate the process of obtaining high quality and high purity steam that is essential for use in steam turbines. If salt is present in the steam, it can lead to serious corrosion and scale problems that drastically reduce the life of a steam turbine. Thus, it is important that the steam be of high quality and purity before it enters the turbine. As such, salts may need to be removed from the steam that enters the turbine. The removal of salt is currently done by removing the entrained droplets of brine from the steam (e.g., by using baffles in the steam flashing chamber). In embodiments disclosed herein, a filter or coalescer that removes all the particulate matter and droplets from the steam phase is contemplated (see, for example, FIGS. 2 and 3).

In various embodiments, a steam flashing step is utilized. The steam flashing step may allow the high pressure and high temperature salty produced brine to be separated from the steam such that high quality steam, with very little salt and solids, can be used in the turbine or other power generation equipment. The hot brine may then be used in thermoelectric generators (TEG) since these devices are much less sensitive to salty brines than turbines. This process provides an alternative to using a heat exchanger and a Rankine cycle that uses a clean working fluid.

Figure 3:
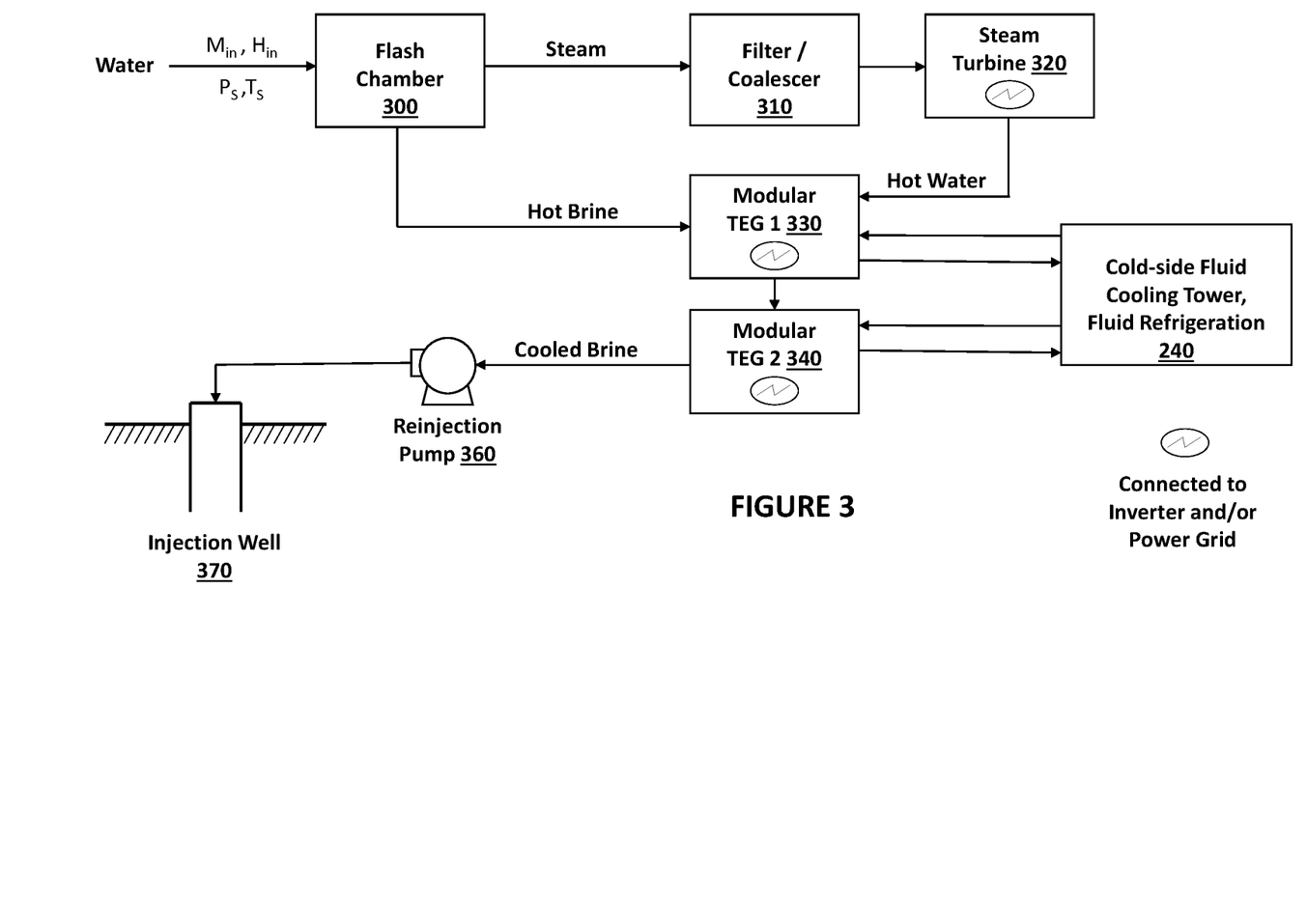
FIG. 3 depicts a representation of an embodiment of an electricity generation process.

FIG. 3 depicts a representation of an embodiment of an electricity generation process that embodies a steam flashing step. In the illustrated embodiment, salt or other materials are removed from fluids (e.g., water) provided to steam turbines or TEGs. In certain embodiments, the flashing of the fluids is conducted in a pressure vessel herein referred to as a flashing chamber 300. Flashing chamber 300 may be rated to a suitable pressure and temperature for the fluids. The steam from the flashing chamber 300 may be passed through a filter or coalescer 310. Filter/coalescer 310 may filter out not only the brine droplets that may be suspended in the steam but also remove suspended particulate matter that can be damaging to the steam turbine blades in steam turbine 320.

While the steam from the flashing chamber 300 is used to generate power in steam turbine 320, the concentrated brine from the flashing chamber and the fresh water from the condensing steam is typically considered a waste stream and is reinjected into the subsurface or recirculated into an injection well in a geothermal facility. In embodiments contemplated herein, however, the heat in both these streams is utilized by running them through thermoelectric generator (TEG) modules 330 and 340.

In some embodiments, when the pressure or temperature of the produced fluid is not high enough, the fluid can be pre-heated using the produced gas or oil. For example, in some instances, the produced fluid may not be hot enough and/or may contain dissolved hydrocarbons that cannot be sold due to lack of infrastructure (such as a gas pipeline). In such instances, it may be possible to use the hydrocarbons produced to pre-heat the produced water such that the water can be used to generate electricity. Any $CO_2$ generated may be captured by contacting the flue gas with the produced brine that is planned for subsurface disposal. The vented flue gas will then have a much smaller $CO_2$ content.

Figure 4:
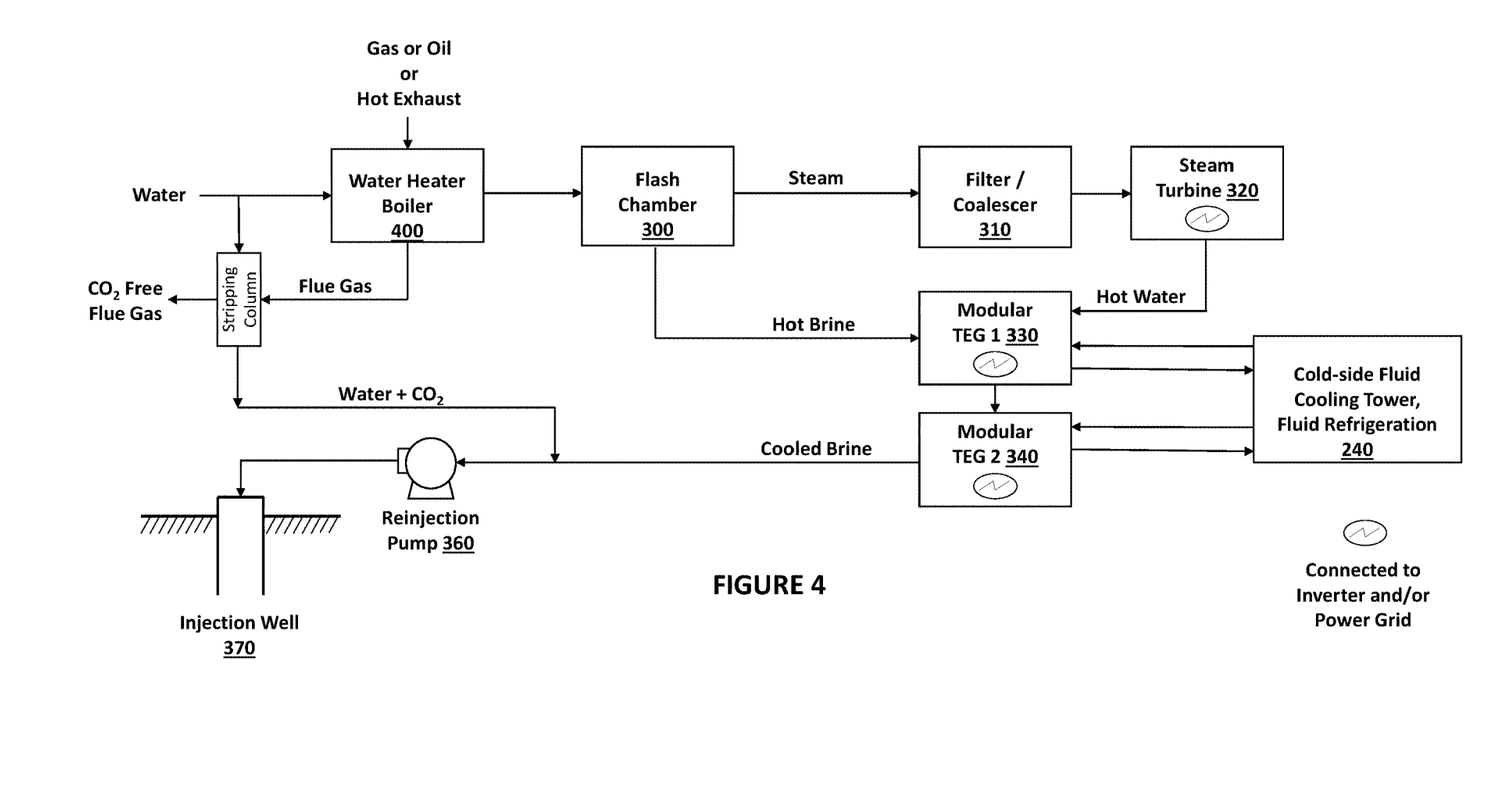
FIG. 4 depicts a representation of an embodiment of an electricity generation process that includes pre-heating of the fluids.

FIG. 4 depicts a representation of an embodiment of an electricity generation process that includes pre-heating of the fluids. In the illustrated embodiment, produced gas or oil (or hot exhaust) is provided to water heater boiler 400 to pre-heat the water/fluid before it enters flash chamber 300. The embodiment depicted in FIG. 4 may also be useful when there is no market for the produced gas or oil (stranded gas or oil). In such cases, instead of flaring the gas and losing all its energy, a significant portion of that energy can be recovered and converted to electricity using a combination of steam turbines and thermoelectric generators (TEGs). In such embodiments, both the flue (exhaust) gas from the combustion and the superheated fluid are used to generate electricity.

In various embodiments, the flue gas generated by the combustion of the hydrocarbons contains $CO_2$ that need to be sequestered to make the process as carbon neutral as possible. In certain embodiments, as shown in FIG. 4, the flue gas is bubbled through water or brine in a stripping column to dissolve any $CO_2$ in the water before disposing it by injection into the subsurface (e.g., into injection well 370). The flue gas after bubbling it through water has very little $CO_2$ left in it and can be vented. This bubbling process makes the overall electricity generation process carbon neutral (near zero $CO_2$ emissions).

In some embodiments, as a final step of the electricity generation process, the water that exits the TEG array (e.g., TEGs 330 and 340) is reinjected into either the subsurface zone it came from or into a different disposal zone. For example, reinjection pump 360 may reinject the water into injection well 370. In some contemplated embodiments, the pumps that are used to inject the water can be powered by the electricity generated by the combined steam turbine and TE generator. Since the power used for moving fluids, pumping, and re-injection comes from the power generated from the hot fluids, the process does not require any incremental power source and may be considered carbon neutral.

In various embodiments, low pressure gas is produced from a formation (or another source). In such embodiments, a compressor may need to be used to increase the pressure of the gas before it can be fed into a pipeline. The process of compressing the gas heats up the gas significantly. Thus, the gas needs to be cooled before it is fed/delivered to the pipeline. The heat from the compressed gas and the flue gas from the compressors is typically wasted and released to the atmosphere. In fact, the oil and gas must often be cooled to certain temperatures before they can be sold and transported by pipeline or truck. In some contemplated embodiments, a heat exchanger, with or without TEG cells, may be used to cool the gas and generate electricity. The heated working fluid may also be used in a TEG to produce additional electricity.

Figure 7:
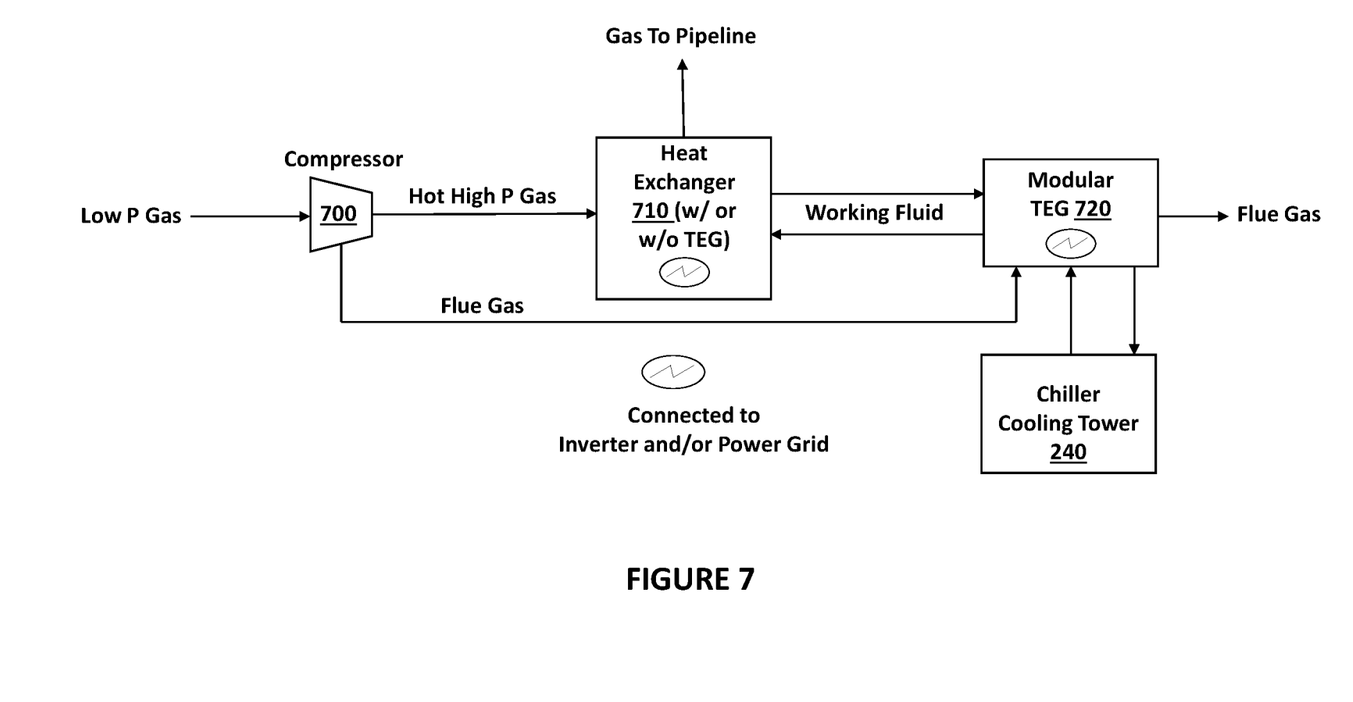
FIG. 7 depicts a representation of an embodiment for utilizing low pressure produced gas.

FIG. 7 depicts a representation of an embodiment for utilizing low pressure produced gas. In the illustrated embodiment, low pressure gas is provided to compressor 700, which generates high pressure gas and flue gas. The hot, high pressure gas is provided to heat exchanger 710, which cools the gas for sending to a pipeline (or truck) by heating a working fluid for TEG 720. In some embodiments, the heat exchanger 710 may contain TEG cells to generate electricity while exchanging heat from the hot gas. The flue gas may also be provided to TEG 720 for electricity generation. In some embodiments, a steam turbine may be used instead of or in combination with TEG 720. The flue gas may be exhausted from TEG 720. Thus, the process depicted in FIG. 7 utilizes the heat from low pressure produced gases, the hot compressed gas, and the flue gas from the generator and converts this heat to electricity by driving electric turbines or a TEG.

The power generation methods for use with fluids produced from the earth that are disclosed herein have significant advantages that are not achievable with traditional steam turbine power generation systems. Limitations of traditional steam turbine power generation systems include, but are not limited to:

Turbines require high grade heat (e.g., high temperature, pressure, and flow rate fluids) to drive the impellers. Such turbines cannot be used with low grade heat sources (lower temperature, pressure, and flow rate fluids).

Turbine systems have high capital costs and a narrow range of power input and output constraints.

Turbines and twin-screw expanders are also limited in their ability to use multi-phase fluids. Fluids produced from the earth (oil, water, or gas) have complex phase behavior and as such cannot be easily used in turbines or twin-screw expanders.

Once installed, the power output capacity of turbine systems cannot easily be changed. Turbine installations are not modular, and decisions related to power output capacity have to be made early. Such decisions usually result in over-designed turbines that operate well below their intended capacity resulting is wasted capital.

Turbines have many moving parts and can be less reliable especially when using steam with lower quality and purity as is expected to be the case with produced brines, water, oil, or gas.

The power generation methods described herein, however, have advantages that are described throughout this disclosure. For example, advantages of the power generation methods described herein include, but are not limited to:

Integrating a heat exchanger with thermoelectric devices such that a portion of the heat from hot fluids is converted to electricity to reduce the load on the heat exchanger while generating carbon neutral electricity.

Eliminating the need for a boiler since no fossil fuel must be burnt to heat the fluids. Thus, generating a process that is carbon neutral and can be carbon negative.

Utilizing a working fluid in an organic Rankine cycle to overcome problems associated with corrosion and scaling of the turbine or other power generation devices when produced brine is used directly in turbines or other expanders. The produced fluid is inhibited from coming into contact with the turbine. Accordingly, issues with corrosion scale and particulates are significantly reduced or eliminated.

Heat from any (or all) of the produced fluids, oil, water, or gas can be utilized.

Heat from surface processing of the produced fluids can also be utilized. Examples include, but are not limited to: heat created by compressors, generators, gas dehydration units, solvent regeneration units and other surface equipment.

The manufacture of TEG modules can be standardized, thereby reducing their cost.

The power output from TEG modules may also be increased or decreased at any time by redirecting the hot and cold fluids through the array depending on the power requirements at that time.

The TEG power output and cost of the array is highly scalable and easily customizable.

The modular nature of the TEG array may be more reliable and fault tolerant. For example, failure of one module can temporarily be compensated for by another module in the array.

The TEG array may be easily relocated. For example, the TEG array may be placed on a mobile skid that can be relocated easily from one well to another to reduce the distance the hot fluids from the well have to be transported.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method for generating electricity, comprising:
    obtaining a first fluid from a well in a subsurface formation, wherein the first fluid includes a combination of water and at least one of gas and oil;
    providing the first fluid to a first power generation device having at least one turbine that generates at least some electricity from expansion of the first fluid in the first power generation device, wherein a pressure and a temperature of the first fluid is adjusted to a pressure and a temperature compatible with the first power generation device using one or more valves coupled to the first power generation device;
    separating the water from the at least one of the gas and oil after the first fluid exits the first power generation device to produce a second fluid including at least one of the gas and oil;
    providing the second fluid to a heat exchanger after the fluid exits the separator to heat a working fluid with heat from the second fluid; and
    using the working fluid to generate at least some electricity with one or more second power generation devices, wherein at least one of the second power generation devices is a thermoelectric generator.

2. The method of claim 1, further comprising providing the working fluid to the one or more second power generation devices, and generating at least some electricity in the one or more second power generation devices using heat from the working fluid.

3. The method of claim 2, wherein the one or more second power generation devices include a thermoelectric generator in a parallel or series combination with one or more additional thermoelectric generators, turbines, or twin-screw expanders.

4. The method of claim 1, further comprising flashing the water in a flash chamber after separation to produce steam and hot brine.

5. The method of claim 4, further comprising providing the brine to the thermoelectric generator.

6. The method of claim 5, further comprising injecting the brine into at least one wellbore in the subsurface formation after the thermoelectric generator.

7. The method of claim 4, further comprising filtering the steam to remove particulate matter from the steam, and providing the steam to a steam turbine.

8. The method of claim 1, further comprising:
    increasing, at a surface of the formation, a temperature of the first fluid; and
    providing the increased temperature first fluid to at least one of the first power generation device and the one or more second power generation devices.

9. A system for generating electricity, comprising:
    a first power generation device, wherein the first power generation device includes at least one turbine configured to receive a first fluid from a well in a subsurface formation and generate at least some electricity using the first fluid, wherein the first fluid includes a combination of water and at least one of gas and oil;

one or more valves coupled to the first power generation device, wherein the one or more valves are configured to adjust a pressure and a temperature of the first fluid at an inlet of the first power generation device to be compatible with the first power generation device;

a separator configured to separate the water from the at least one of the gas and oil after the first fluid exits the first power generation device to produce a second fluid including at least one of the gas and oil;

a heat exchanger configured to receive the second fluid from the separator, wherein the heat exchanger is configured to heat a working fluid with heat from the second fluid; and one or more second power generation devices configured to receive the working fluid from the heat exchanger, wherein at least one of the second power generation devices is a thermoelectric generator configured to generate at least some electricity using the heated working fluid.

10. The system of claim 9, wherein the thermoelectric generator is configured to generate electricity with heat from the heated working fluid.

11. The system of claim 9, wherein the thermoelectric generator includes a plurality of thermoelectric generation cells arranged in series or parallel along a direction a flow of the heated working fluid.

12. The system of claim 9, wherein the heat exchanger includes at least one additional thermoelectric generator that is integrated into the heat exchanger.

13. The system of claim 9, wherein the thermoelectric generator includes one or more thermoelectric generation cells arranged with thermal insulating materials that increase heat flow to the thermoelectric generation cells.

14. The system of claim 13, further comprising one or more heat fins in the thermoelectric generator, wherein the heat fins are configured to increase heat transfer from hot and cold fluids in the thermoelectric generator.

15. The system of claim 9, further comprising a flash chamber coupled to the one or more second power generation devices, wherein the flash chamber is configured to generate steam and hot brine from water separated from the first fluid.

16. A method for generating electricity, comprising:

obtaining a fluid from a well in a subsurface formation, wherein the fluid includes a combination of water and at least one of gas and oil;

increasing, at a surface of the subsurface formation, a temperature of the fluid;

providing the fluid with the increased temperature to a first power generation device having at least one turbine that generates at least some electricity from expansion of the fluid in the first power generation device;

separating the water from at least one of the gas and oil after the fluid exits the first power generation device;

flashing the water in a flash chamber after separation to produce steam and hot brine; and providing the hot brine to one or more second power generation devices, wherein at least one of the second power generation devices is a thermoelectric generator that generates electricity using heat from the hot brine.

17. The method of claim 16, further comprising providing at least one of the gas and oil to a heat exchanger after separation to heat a working fluid with heat from at least one of the gas and oil.

* * * * *